Sept. 28, 1954 L. A. WILSON 2,690,301

RECORD CARD

Original Filed Aug. 19, 1950 3 Sheets-Sheet 1

INVENTOR
*L. A. WILSON*

BY
J W Armbruster
ATTORNEY

Sept. 28, 1954 L. A. WILSON 2,690,301

RECORD CARD

Original Filed Aug. 19, 1950 3 Sheets-Sheet 2

INVENTOR
L. A. WILSON
BY
J W Armbruster
ATTORNEY

Sept. 28, 1954 L. A. WILSON 2,690,301

RECORD CARD

Original Filed Aug. 19, 1950 3 Sheets-Sheet 3

INVENTOR
L.A. WILSON
BY
J W Armbruster
ATTORNEY

Patented Sept. 28, 1954 2,690,301

UNITED STATES PATENT OFFICE 2,690,301

RECORD CARD

Lawrence A. Wilson, Garden City, N. Y., assignor to International Business Machines Corporation, New York, N. Y., a corporation of New York Original application August 19, 1950, Serial No. 180,354. Divided and this application October 20, 1951, Serial No. 252,388

1 Claim. (Cl. 235—61.12)

This is a division of the copending patent application, Serial No. 180,354, filed on August 19, 1950, for a Mark Sensing Reproducer.

The invention relates to a novel form of record card and is illustrated in connection with census work in which the large double-decked record is marked on both sides by the census taker and forms the original document which is sensed to control the perforation of standard IBM accounting machine cards.

When a record such as a census slip or meter record is made by penciling in areas indicative of data readings, it is advisable that such a marked record should be larger than the well-known form of 80-column perforated card known as an IBM card. By using a record area approximately twice as large as the usual tabulating card and by using both back and front of such a document it is possible to devote approximately four times the area of a perforation index point for the pencilled area of a single notation for the census record or meter reading. Therefore, by marking such a large record and later from it controlling perforation of a standard record it is made easier for the census taker to mark the original document.

It is also an object to so devise a large mark-receiving record that it is adapted to control standard reproducing punching mechanism to perforate a standard tabulating card. The large record is proportioned to be equal in size to two standard cards plus a middle strip equal to the separation area ordinarily between successive common cards as they pass through a standard reproducer. In other words, the marked document when passed through a standard reproducer takes the place of two successive perforated cards and is analyzed simultaneously in four places, i. e., the double decks and both faces of the document.

A standard tabulating card has a height equivalent to thirteen index point spaces. These are also referred to at times as the cycle points of the machine, i. e., the ten digit cycle points, two special position cycle points and the one extra cycle point representative of the marginal areas at the top and bottom of the card. As such standard cards pass through a reproducer they are separated by a space equal to the distance between two successive index points. Therefore, the reproducer operates on a fourteen-point cycle, thirteen points of which is represented by the card height and one point by the separation between successive cards. In conformity with such proportions, the present large marked document is proportioned with a height equal to twenty-seven cycle points which includes double spacing of twelve data-receiving points, two marginal points and one spacing point, and therefore the large record is exactly two and one-thirteenth times the height of a standard record.

Other objects of the invention will be pointed out in the following description and claim and illustrated in the accompanying drawings, which disclose, by way of example, the principle of the invention and the best mode, which has been contemplated, of applying that principle.

In the drawings:

Fig. 1 showing the front face and Fig. 2 showing the rear face.

Figure 1:
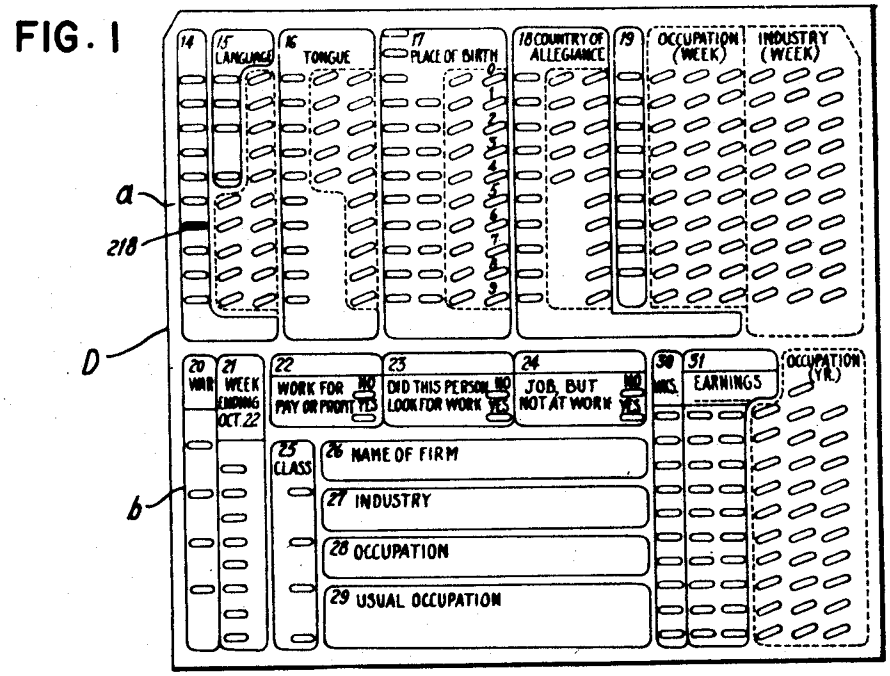
Figs. 1 and 2 show a sample marked census document.
Figure 2:
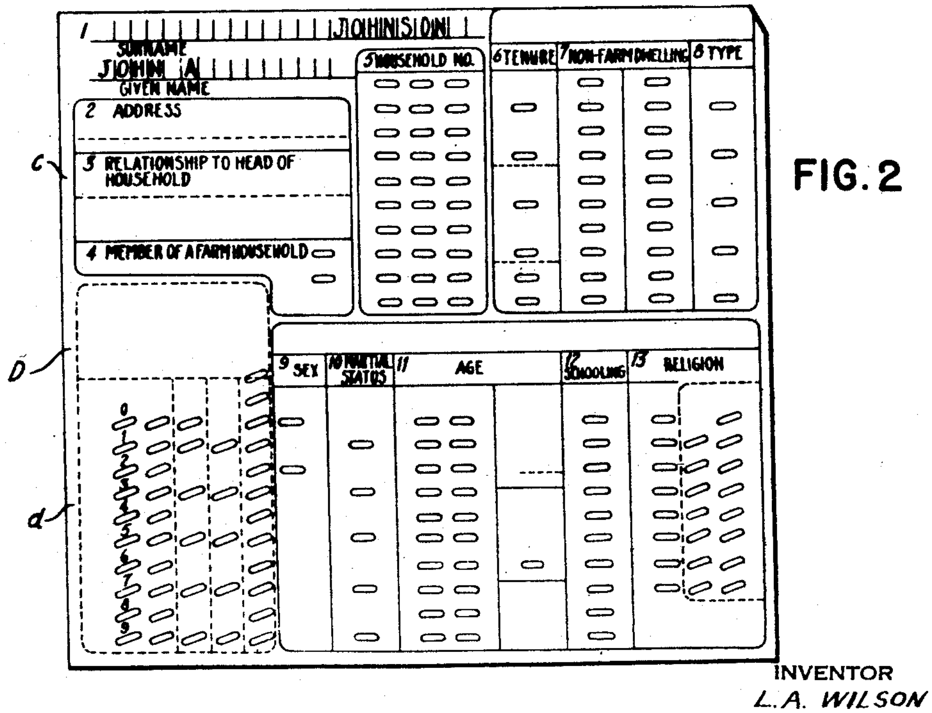

Referring to Fig. 1, it is seen that the document D is proportioned with two decks *a* and *b* of marked information index points there being twelve possible points in each column of a deck in the standard IBM fashion and there being twenty such columns in each of the decks. Each mark-receiving area is defined by a printed elliptical shape to receive a conductive pencil mark. Fig. 2 shows that the same arrangement applies for the other face of document D with the decks *c* and *d* also each providing twenty columns of index point positions.

Figure 3:
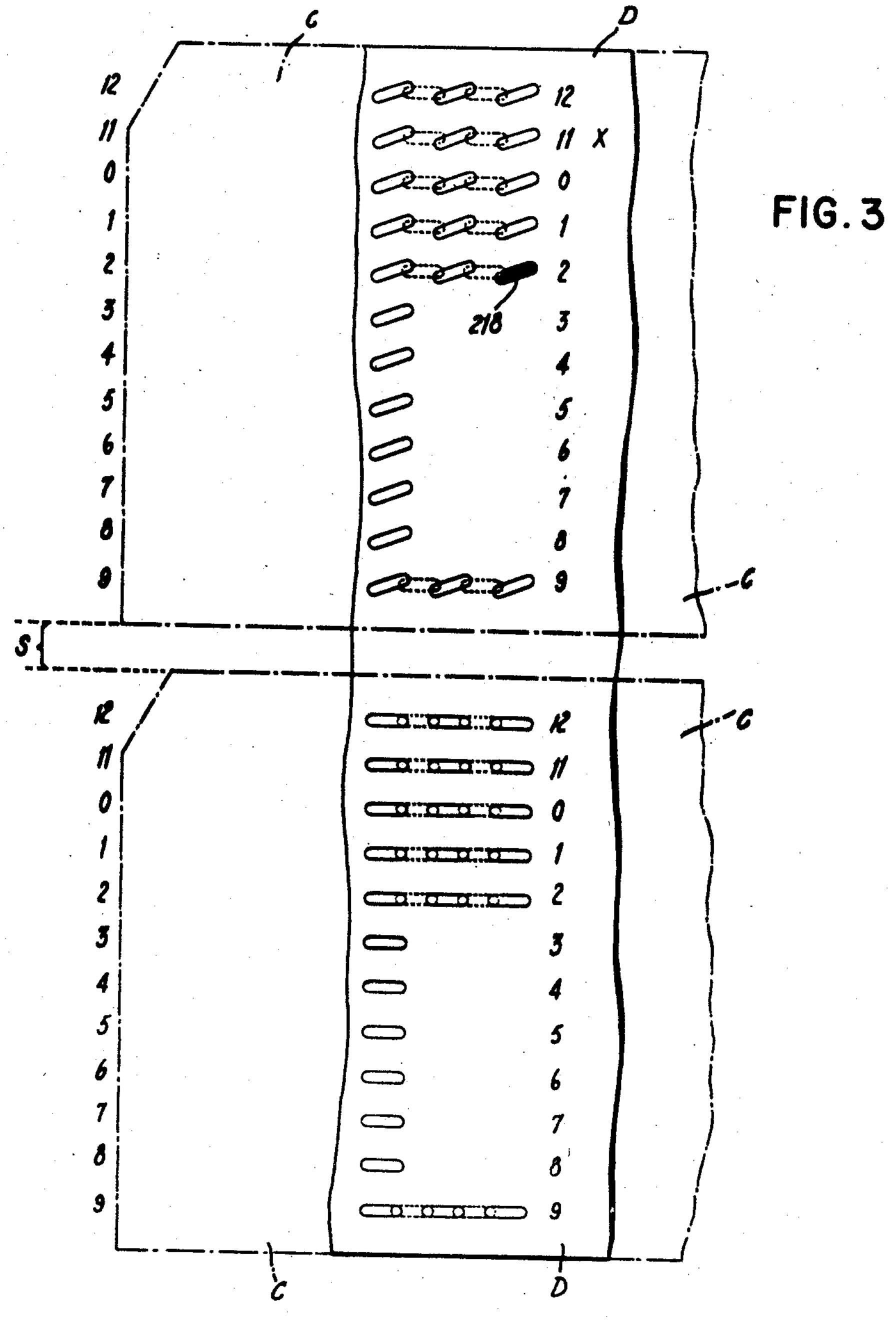
Fig. 3 is a diagrammatic view showing a portion of the marked document and illustrating the alternation of the index points on the upper and lower faces and also revealing the proportions of the document when compared with two standard tabulating cards.

In order to adapt the record for census work the columns are grouped for various designations such as place of birth, language spoken, occupation, etc. The areas for receiving marks indicative of the data being collected are outlined with single and grouped printed areas and marked with digits to further code the information. By referring to Fig. 3, it is noted that such mark-receiving areas are not superimposed on the front and back faces of the document but instead are alternated in placement so that they provide a staggered arrangement, with the document observed on end. In other words, a column of points on the back face is interspersed between two columns of index points on the front face. Therefore, the marks made on one face of the document will occur in comparatively free areas and not interfere with brushes arranged to sense two adjacent areas of the other face of the record.

The marks are made with a special pencil with lead having good electrical conductive qualities so that when a three-pronged brush set is drawn over the moving document and a mark is encountered by the brush set a circuit is established between a central brush 15 and conducted to either or both of the outer brushes 16 of the set.

The large document D (Fig. 3) is proportioned to take the place of two standard cards C as they appear when fed in succession through the reproducer. It is noted that the large document is slightly greater in height than the two cards, the difference being represented by the space S which is equivalent to one index point of space or one cycle point space which is the separation distance existing when standard cards are directed through the reading station of the standard reproducer. Therefore, the single large document D is adapted to take the place of two successive cards in the reproducer, and when read simultaneously on all four decks it is in effect a control equivalent to one eighty-column perforated card. The length or width of the large document is exactly that of a standard card and, therefore, the general data-receiving area both back and front is the equivalent roughly of four tabulating cards. Therefore, the marking area is approximately four times that of the perforation receiving area of a standard card and this provides plenty of room for the marks and for the notations associated therewith.

Figure 4:
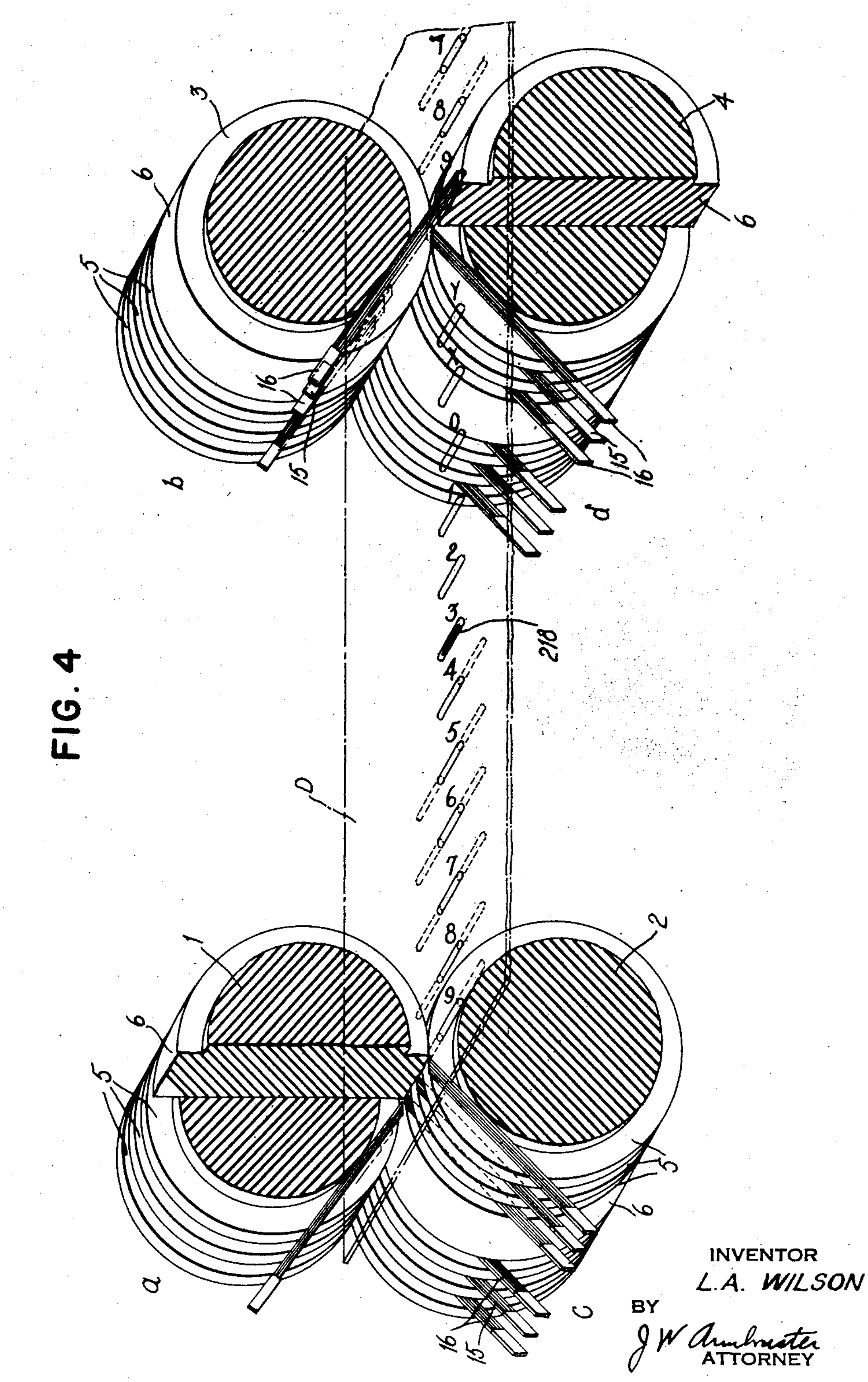
Fig. 4 is a perspective view showing the document sensing unit and revealing how the alternately notched rods separate the sets of mark sensing brushes and provide platforms for the tips of the brushes.

In order to bring out the advantages of the arrangement of index points on the new document it is believed well to explain how such index points cooperate with a sensing means. Referring to Fig. 4 it is noted that the four lines of sensing brushes, *a*, *b*, *c* and *d*, are arranged in a novel fashion and guided and separated by notched insulation rods 1, 3, 2 and 4. In each pair of oppositely facing lines of brushes, such as the lines *a* and *c*, the brushes *a* for the upper side of the pattern document, are guided by the insulation rod or member 1 but impinge upon rod 2 which also acts as a guide for the brushes *c* of the lower set. Thus each rod serves for dual purposes of insulating two lines of brushes. Each insulation rod is notched at twenty regular wide intervals with three closely spaced notches 5 for the brush set of one index point. The three closely mounted brushes of a set are wired electrically so that when a document mark spans the tips, a central brush 15 is caused to conduct current from either of the outer brushes 16 and a punch control circuit is established. The sets of brushes are staggered in arrangement, i. e., a top brush set is located between two longer brush sets. In the absence of a document, the tips of the upper brush set normally rest on a blank or unnotched portion 6 of the opposite lower insulation rod. In a similar fashion the lower sets of brushes rest on blank unnotched portions of the opposite upper insulation rod. It is because of the novel arrangement of marked areas in interspersed formation on the pattern document that it is possible to arrange the cooperating sensing devices in such a safe, workable and economical fashion.

The four lines of brushes *a*, *b*, *c* and *d* shown in Fig. 4 are seen to cooperate with the four decks of marked information on both sides of the document D. As the document is moved from left to right, the four lines of brushes simultaneously read all eighty-columns of coded information. Thus the markings are converted into timed impulses for controlling the operation of punch interposer magnets so that all eighty columns of information are perforated simultaneously in a card at the punch station of a reproducer.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of following claim.

What is claimed is:

An enlarged tabulator card form of statistical document for receiving manual marking and for controlling card-controlled machines, said document having wide mark receiving index point areas for receiving conductive control marks, said areas being four times the width of a column in a standard tabulator card of the eighty-column kind, said mark areas being arranged on both faces of the document, each face bearing two decks of areas with twelve rows of areas per deck, said areas of the rows being arranged in twenty columns, said corresponding columns of opposite faces being staggered in arrangement so that a conductive mark made on one face is between two areas of two adjacent columns on the other face, said document being proportioned in height equal to two and one-thirteenth times the height of said standard tabulator card and with the decks of each face separated by three standard index point spaces, whereby said document has the same data capacity of eighty orders as said standard card but with four times its mark receiving area, has mark areas staggered to allow cooperating sensing means to be staggered and electrically separated, and is physically proportioned so much more than doubled as to height as to be handled as if it were two successive standard cards and have all four decks sensed simultaneously in a card-controlled machine of the continuous feed type controlled by a continuous series of separate cards.

References Cited in the file of this patent

UNITED STATES PATENTS

| Number | Name | Date |
|---|---|---|
| 2,098,359 | Reynolds | Nov. 9, 1937 |
| 2,124,906 | Bryce | July 26, 1938 |
| 2,493,848 | Ayres | Jan. 10, 1950 |